United States Patent [19]

Watanabe et al.

[11] Patent Number: 5,292,150
[45] Date of Patent: Mar. 8, 1994

[54] COVER OF AIR BAG DEVICE

[75] Inventors: Kazuo Watanabe; Takayasu Zushi, both of Shiga, Japan

[73] Assignee: Takata Corporation, Tokyo, Japan

[21] Appl. No.: 977,208

[22] Filed: Nov. 16, 1992

[30] Foreign Application Priority Data

Dec. 11, 1991 [JP] Japan .................................. 3-327583

[51] Int. Cl.⁵ .............................................. B60R 21/20
[52] U.S. Cl. ..................... 280/728 B; 428/43; 428/135
[58] Field of Search ............... 280/728 R, 728 B, 731, 280/732, 752; 428/43, 134, 135, 138; 220/266

[56] References Cited

U.S. PATENT DOCUMENTS 3,770,560 11/1973 Elder et al. ...................... 428/135

FOREIGN PATENT DOCUMENTS 184549 7/1988 Japan ................................. 280/728 B
2244459 12/1991 United Kingdom ............ 280/728 B Primary Examiner—Karin L. Tyson
Attorney, Agent, or Firm—Kanesaka and Takeuichi

[57] ABSTRACT

An air bag cover includes recessed portions for tearing the cover which are disposed to be spaced apart from each other in a row to the inner surface, each of the top ends of recessed portions in the direction of the row being pointed, toward each of adjacent recessed portions. The pointed top end is situated at a position deviated from a center for the recessed portion along a lateral direction of the recessed portion.

4 Claims, 10 Drawing Sheets

COVER OF AIR BAG DEVICE

FIELD OF THE INVENTION

The present invention relates to a cover of an air bag device for protecting an occupant of a vehicle.

DESCRIPTION OF THE RELATED ART

As shown in FIG. 6, an air bag device is disposed in a central portion of a steering wheel 10 of a vehicle such as an automobile. In the air bag device, an inflator and an air bag are attached to a retaining plate generally referred to as a retainer, and air bag container cover 11 is mounted so as to cover them. In the drawing, reference numerals 12 denote spokes for the steering wheel.

In the air bag containing cover 11, a weakened zone is disposed so as to be torn along an expected line upon actuation of the air bag. The weakened zone may comprise a groove formed continuously or intermittently like a stitched line to a portion of an expected tear line 13. Alternatively, when the cover 11 comprises a two layered lamination structure of a rigid layer (core layer) and a soft layer (skin layer), slits may be formed to the rigid layer (core layer) along the tear line.

In the conventional air bag cover described above, the weakened zone is uniformly weakened at any of the portions. Therefore, a position for starting tearing of the weakened zone sometimes varies depending on the way of folding the air bag in the cover. For instance, tearing starts in some cases from the weakened zone near the end of the cover.

For overcoming such a problem, the present applicant proposed an air bag cover in Japanese Patent Application Hei 2-134683 (hereinafter referred to as "application 1"), which has recessed holes intermittently arranged in a row to the inner surface for inflation tearing upon starting the of the air bag, wherein an end of each recessed hole in the direction of the row has a shape pointed to an adjacent recessed hole.

FIG. 7 is an enlarged view for a portion at the inner surface of an air bag cover that shows the tear line of an air bag containing cover in the first embodiment of the application 1, FIG. 8 is a cross sectional view taken along lines VIII—VIII in FIG. 7 and FIG. 9 is a cross sectional view taken along lines IX—IX in FIG. 7. As shown in the drawings, the tear line 13' in the air bag cover 10' of the application 1 comprises a continuously extended groove 14 and deeply perforated recess 15 spaced apart in the groove 14. The groove 14 has a triangular cross sectional shape.

The recessed portion 15 has a pentagonal cross sectional shape comprising a vertical wall 15a perpendicular to the inner surface 10a of the cover 10', a slope 15b formed so as to define a triangular cross sectional shape at the bottom of the side wall 15a and has a hexagonal planar shape as viewed vertically to the cover inner surface 10a, in which each of ends 15p, 15q situated at two opposing apexes of the hexagonal shape is pointed toward each of adjacent recessed portion 15. Further, the ends 15p, 15q are disposed along the center line for the tear line 13.

The air bag containing cover 10' of the application 1 starts to tear from the recessed portion 15 arranged in a row to the inner surface spaced from each other. Tearing of the cover 10' propagates from the pointed ends 15p, 15q of the recessed portion 15 to each of the adjacent recessed portion 15. Therefore, tearing of the cover 10' surely prevails along the direction of the row of the recessed portions 15.

By the way, an air bag cover is usually manufactured by injection molding, by using a die having a protruding ridge for forming thin walled portion of a tear line in the form of the recessed groove. Since the die gap is narrow, there is a problem that the protruding ridges in the die inhibits the flow of an injected resin material tending to cause molding failure.

The present applicant proposed a method of injection molding an air bag cover to solve such a problem in Japanese Patent Application Hei 2-161796 (hereinafter referred to as "application 2"). In the application 2, gates are disposed to at least two of a plurality of dividing regions which are formed by dividing a cavity by tear line forming protruding ridges of the die. A resin is injected from the gates parallel to the cavity.

In the method according to the application 2, the resin can be charged effectively into the die.

However, when the air bag cover of the application 1 is formed by the method disclosed in the application 2, a resin is found to flow uneasily to a portion for forming the recesses.

For instance, in a case of molding an air bag cover 11 as shown in FIG. 6, gates are generally disposed at least in divided regions in the cavity corresponding to $S_1$ and $S_2$ partitioned by a tear line 13c at an area between tear lines 13a and 13b. In this case, the air bag cover of the application 1 has the top ends 15p, 15q pointed in the direction of row of the recessed portions 15 and situated on the center of the tear line, and the resins injected from the gates into the cavity are charged as symmetrical resin flows $R_1$-$R_8$ (FIG. 10) to protrusions 16 for forming the recessed portions 15. The resins thus flowing collide each other at the protrusions 16, so that the resins are not packed fully between the protrusions 16 and a weld line W tends to be formed.

OBJECT AND SUMMARY OF THE INVENTION

An object of the present invention is to provide an air bag cover capable of overcoming the problems of the applications 1 and 2 described above, and having excellent tearing performance and excellent moldability.

An air bag cover in a first aspect of the present invention has recessed portions for starting to tear the cover. The recessed portions are arranged to be spaced apart from each other on an inner surface of the cover. A top end of each of the recessed portions in the direction of row of the arrangement has a shape pointed to each of adjacent recessed portions, and each of the pointed top ends is arranged at a position deviated from a center of the recessed portions to the lateral direction of the recessed portion. The lateral direction is perpendicular to the direction of a row of the recessed portions.

In an air bag containing cover in a second aspect of the present invention, the recessed portion of the first aspect has at least one of trapezoidal, arcuate and triangular planer shapes when viewed in the direction vertical to the inner surface of the cover.

When the air bag cover according to the present invention is molded, protrusions 17 of a die for forming the recessed portion are situated, for example, as shown in FIG. 5 such that pointed corners 17a, 17b are at positions deviated laterally from a center line L perpendicular to the direction of a row of the recessed portions. Accordingly, resins injected into a cavity flow as shown in FIG. 5, as streams $R_9$-$R_{16}$ which are asymmetrical with respect to the center line L. The resin flows smoothly as shown at $R_9$–$R_{12}$ between the corners 17a, 17b of adjacent protrusions 17. Further, a weld line is situated at a position deviated from a portion between the corners 17a, 17b. As a result, an air bag cover is prepared with excellent molding stability and tearing stability.

PREFERRED EMBODIMENTS

Figure 1:
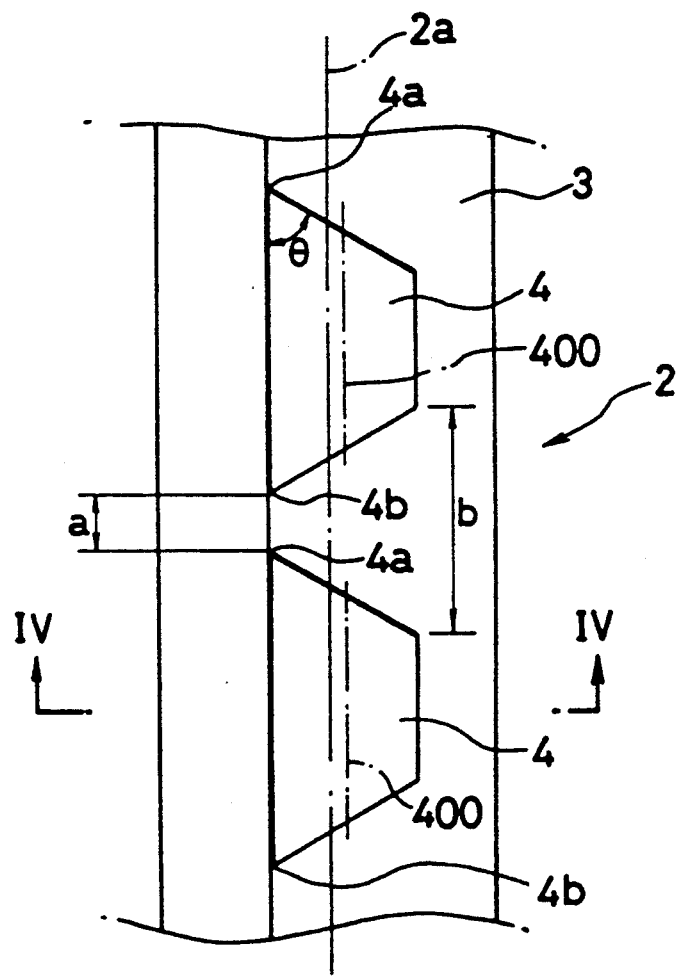
FIG. 1 is an enlarged plan view for a portion of a cover, as viewed from the rear side of a preferred embodiment according to the present invention.
Figure 2:
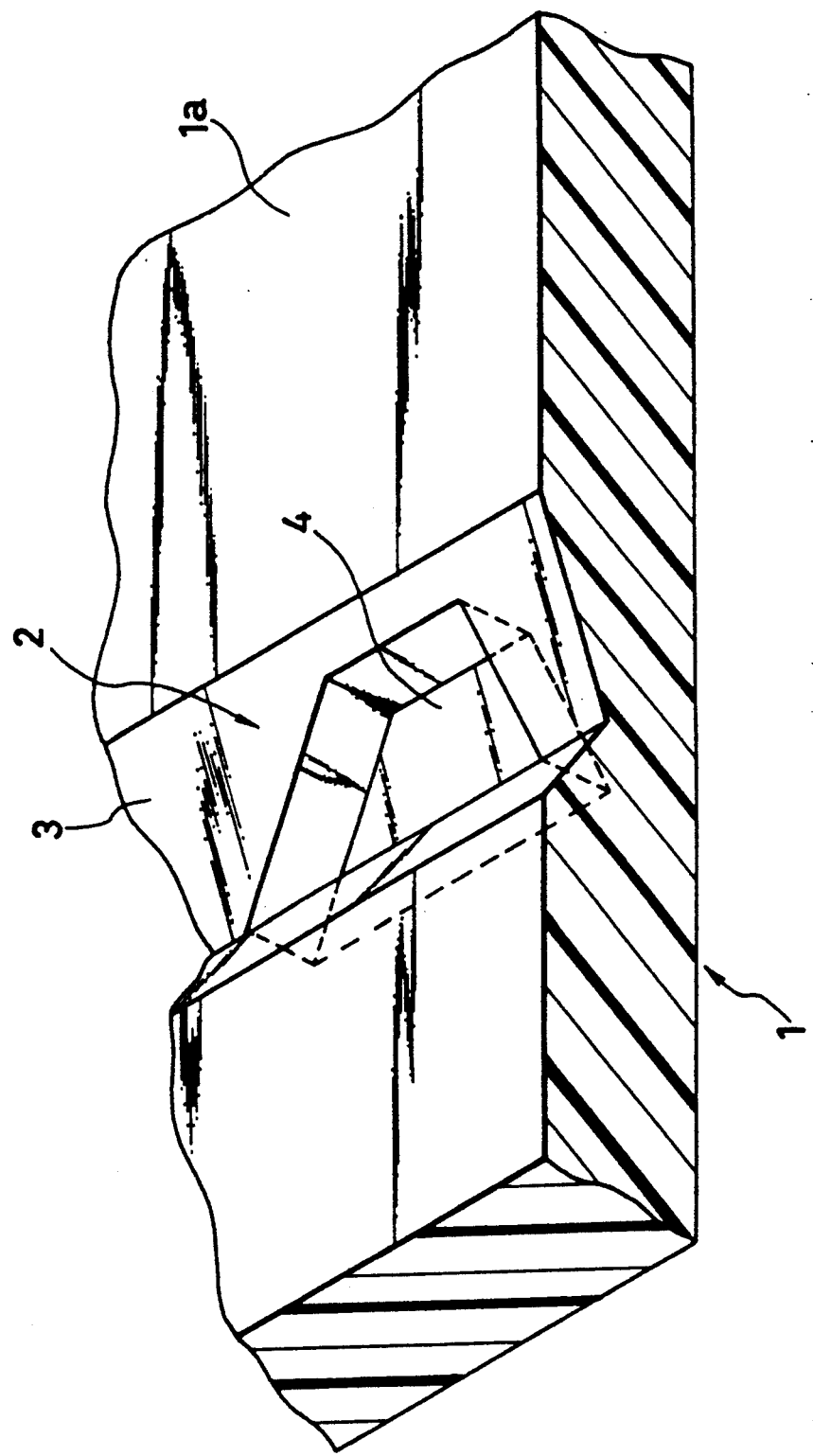
FIG. 2 is an enlarged perspective view with a cross section of a portion shown in FIG. 1 in an air bag containing cover of a single layer structure.
Figure 3:
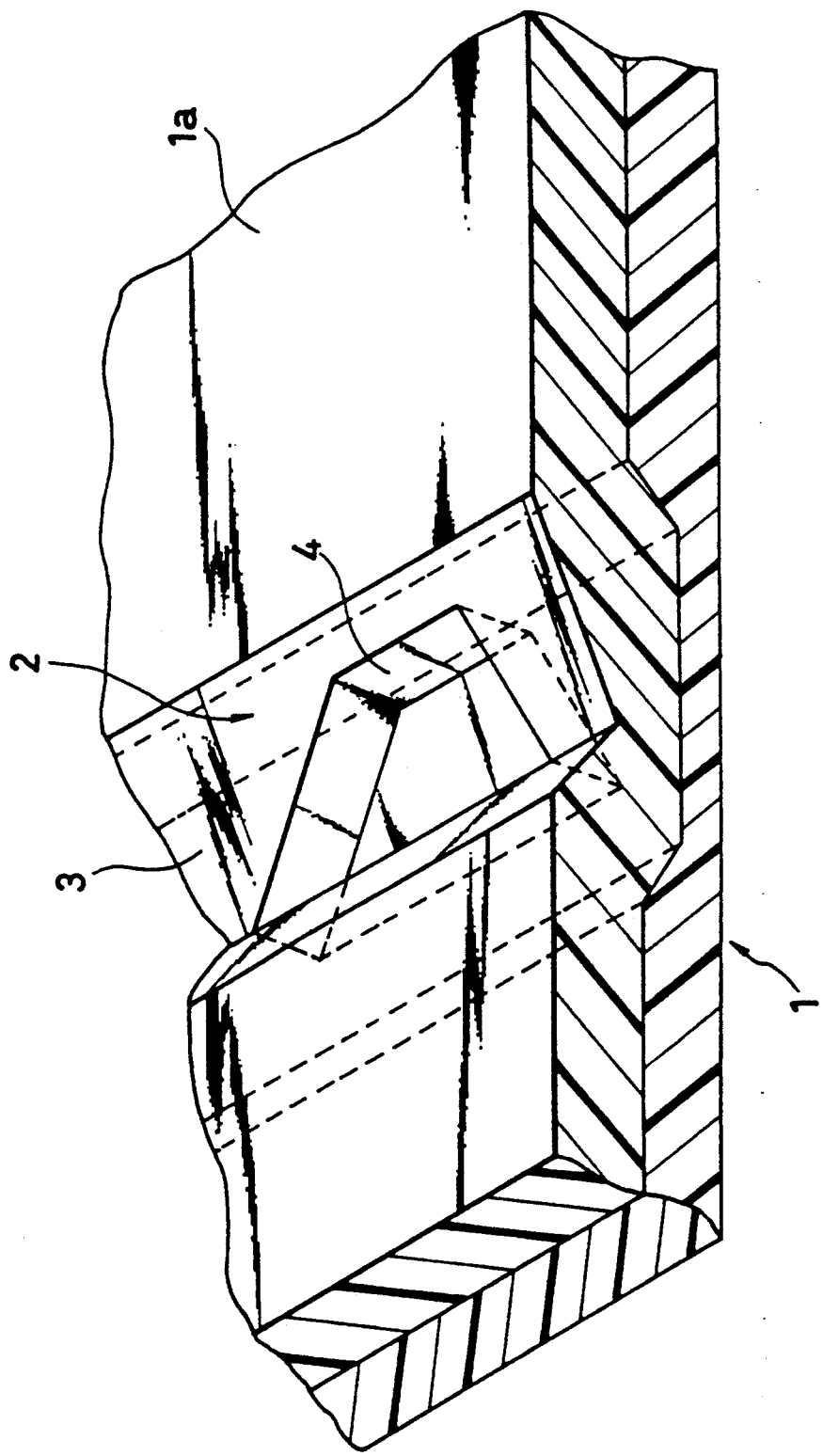
FIG. 3 is an enlarged perspective view with a cross section of a portion shown in FIG. 1 in an air bag containing cover of a two layer structure.
Figure 4A:
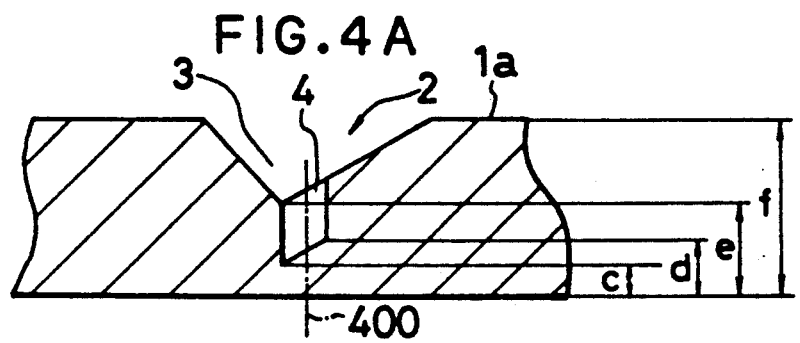
FIG. 4A and FIG. 4B are cross sectional views taken along line IV—IV shown in FIG. 1 in the air bag containing cover of a single layer structure and FIG. 4C and FIG. 4D are cross sectional views taken along line IV—IV shown in FIG. 1 in the air bag containing cover of a two layer laminate structure.
Figure 4B:
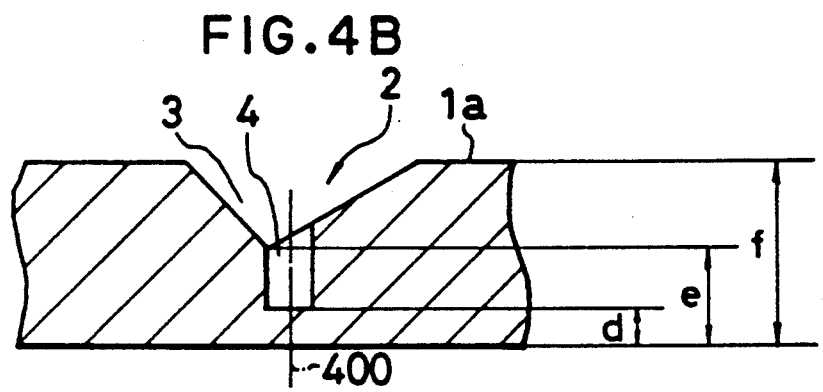
Figure 4C:
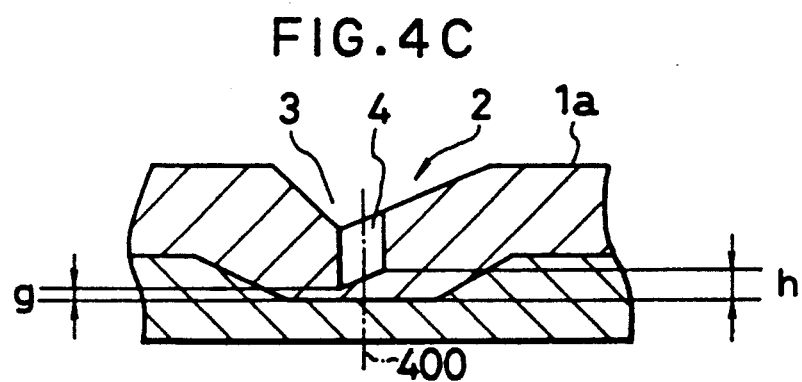
Figure 4D:
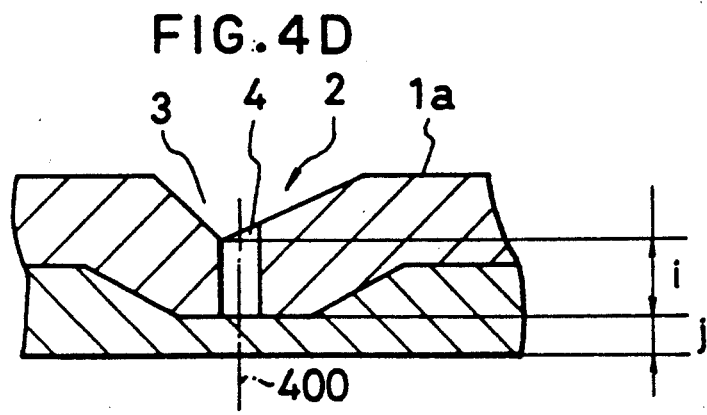
Figure 5:
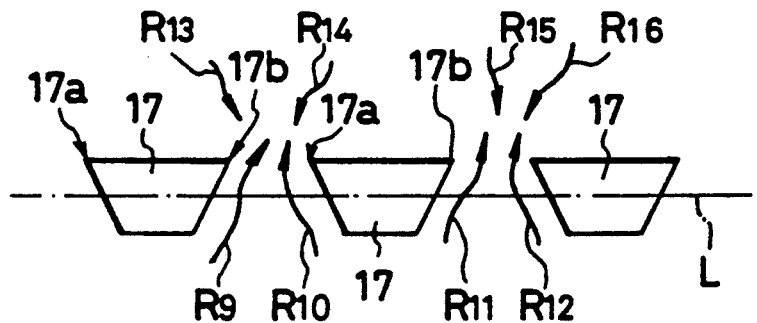
FIG. 5 is an explanatory view illustrating the flow of the resin upon injection molding.

Description will be made more in details to the present invention referring to preferred embodiments shown in the drawings.

A tear line 2 of an air bag containing cover 1 in an embodiment shown in FIGS. 1–4 comprises a continuously extended groove 8 and recessed portions 4 perforated deeply and spaced apart from each in the groove 3. The groove 3 has a triangular cross sectional shape. The recessed portion 4 has a substantially trapezoidal planer shape as viewed vertically relative to a cover inner surface 1a. Top ends 4a, 4b situated at two acute apexes of the trapezoid and pointed to each of adjacent recessed holes 4 are at the position deviated from the center 40D for the recessed hole in the direction perpendicular to the direction of the row of the recessed holes. In this embodiment, the top ends 4a, 4b are deviated from a center line 2a for the tear line 2.

Figure 14:
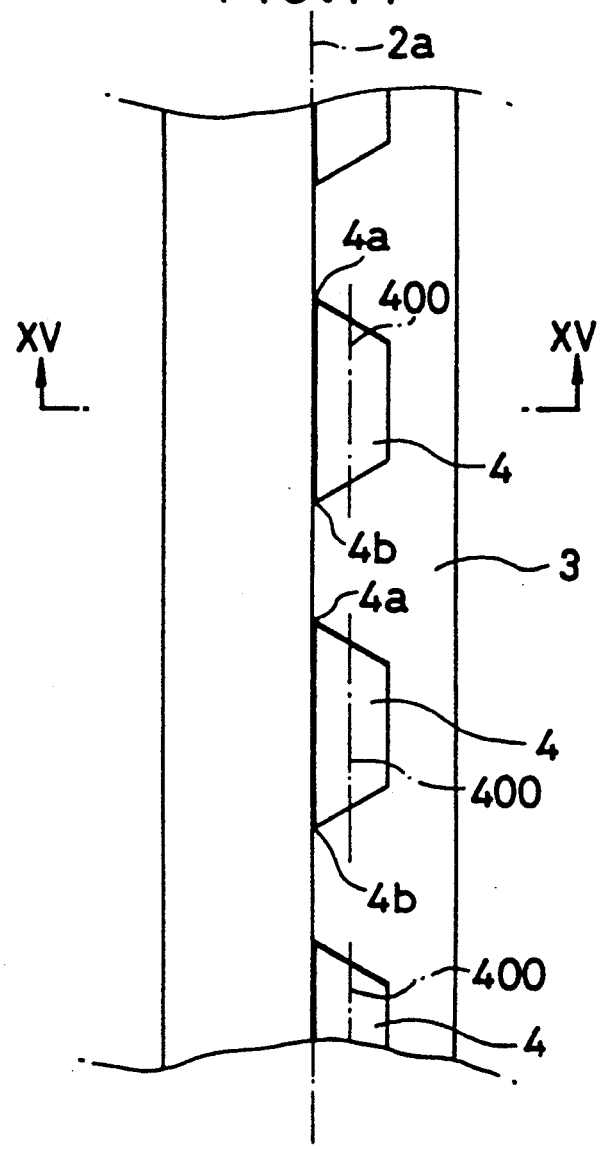
FIG. 14 is an enlarged plan view for a portion, as viewed from the rear side, of a cover according to a further embodiment of the present invention.
Figure 15:
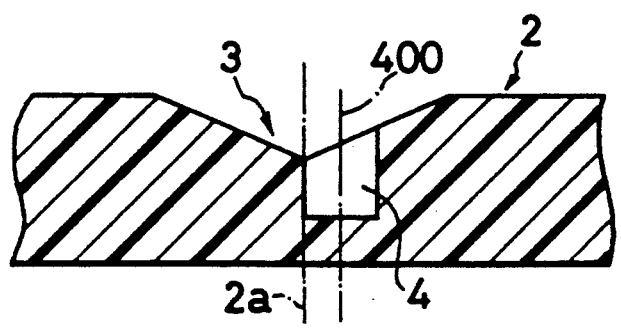
FIG. 15 is a cross sectional view taken along line XV—XV in FIG. 14.

In embodiments shown in FIGS. 14 and 15, the center line 2a and the top ends 4a, 4b are on an identical line.

The air bag cover according to the present embodiment has the same constitution as that in the air bag containing cover of the application 1 described below excepting that the pointed top ends of the recessed groove are at the position deviated from the center line for the recessed portion.

Figure 6:
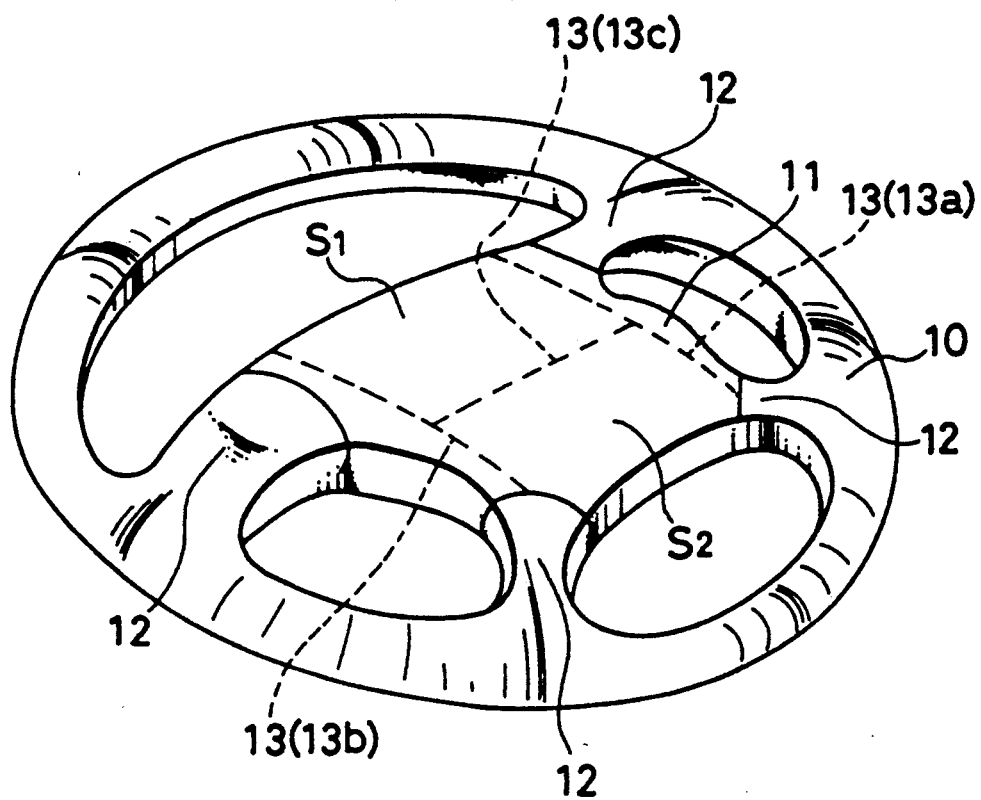
FIG. 6 is a perspective view of a steering wheel mounted with an air bag containing cover.
Figure 7:
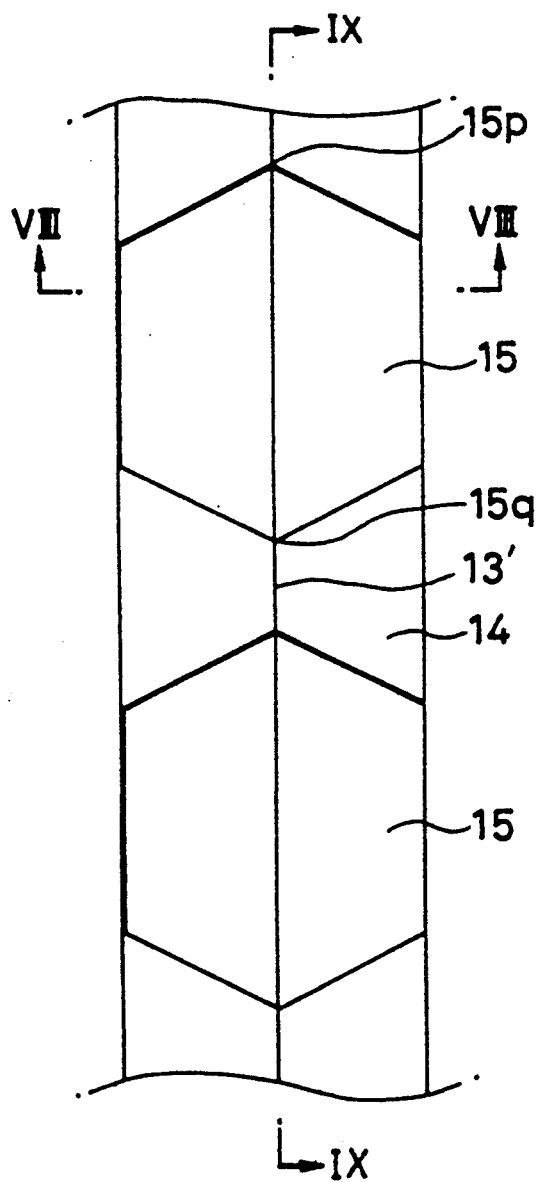
FIG. 7 is a plan view showing a tear line of an air bag containing cover according to the prior application as viewed from the rear side.
Figure 8:
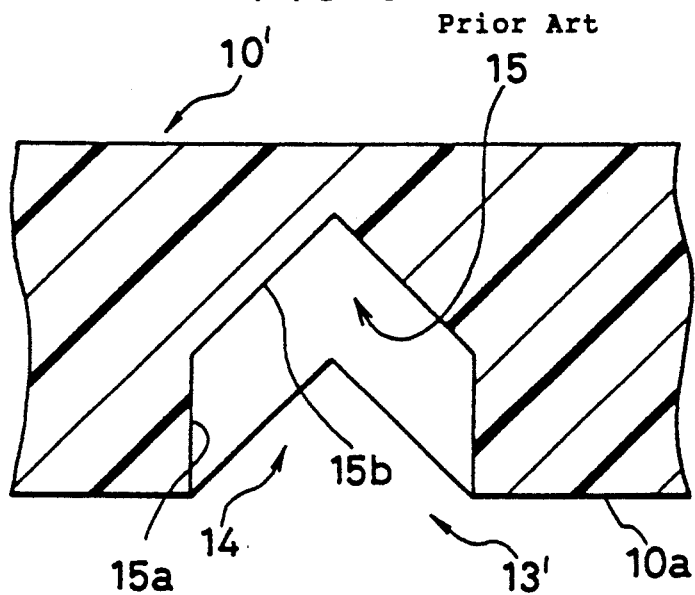
FIG. 8 is a cross sectional view taken along line VIII—VIII in FIG. 7.
Figure 9:
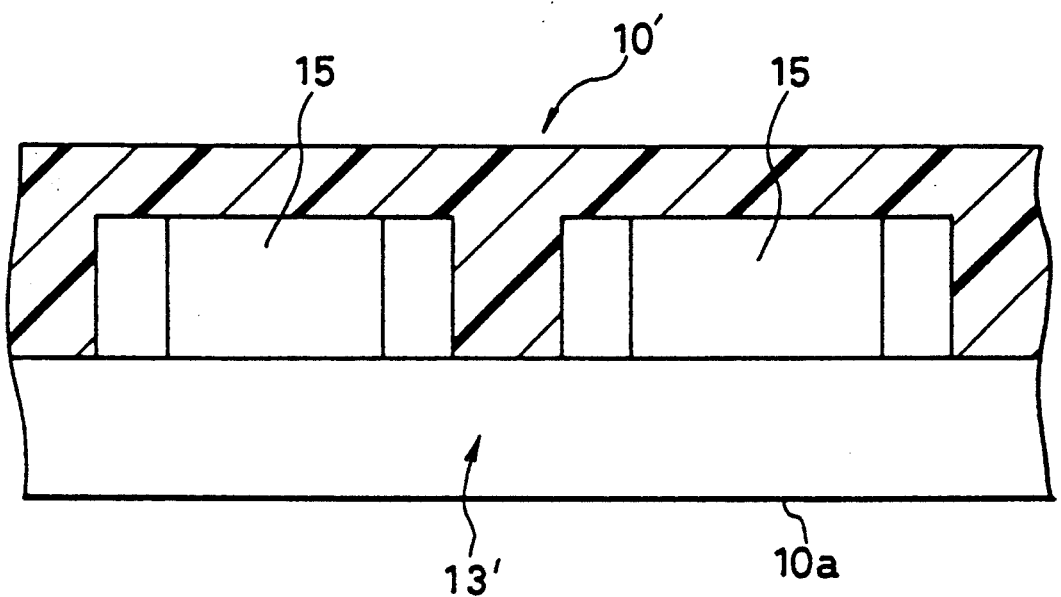
FIG. 9 is a cross sectional view taken along line IX—IX in FIG. 7.
Figure 10:
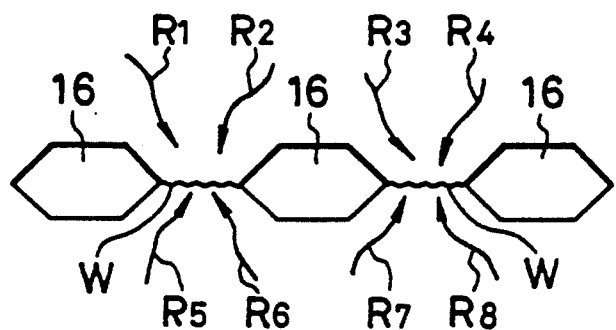
FIG. 10 is an explanatory view illustrating the flow of a resin upon injection molding.

That is, the air bag cover is of a substantially rectangular shape, in which a tear line for starting has as shown in FIG. 6, a central tear line 13c and end tear lines 13a, 13b. The central tear line 13c extends in the central area of the cover lengthwise of the cover. The tear lines 13a, 13b extend in the shorter direction of the cover and disposed along an edge of the cover. The tear line 13c and the tear lines 13a and 13b are disposed contiguously.

In the center tear line 13c, recessed portions are formed with a close distance between the adjacent recessed portions in the central area of the cover. Distance between the recessed portions is increased, that is, they are disposed roughly as they approach the tear lines 13a, 13b, apart from the central area of the cover.

In the tear lines 13a, 13b, distance between the recessed portions is made substantially equal with each other but distance between the recessed portions may be decreased near the central area in the longitudinal direction of the tear lines 13a, 13b and may be increased as they apart therefrom like that in the tear line 13c.

While there is no particular restriction for the material of the cover used in the present invention, a thermoplastic polymer having JIS-K7203 bending modulus of the elasticity greater than 1000 kg/cm² is preferred for instance. Specifically, there can be mentioned thermoplastic elastomers and polyolefinic soft materials such as of olefinic, styrenic, polyester, polyurethane, vinyl chloride and polyamide type materials. A reaction-injection-molded urethane inserted with a net is also suitable.

Although not intending to restrict the present invention, the sizes $(a)$–$(j)$ shown in FIG. 1 and FIGS. 4A–4D may preferably have the following value.

a : 1–3 mm
b : 1–5 mm
c : 0.5–2 mm
d : 0.5–2 mm
e : 0.5–3 mm
f : 4–7 mm
g : 0–2 mm
h : 0–2 mm
i : 0.5–2 mm
j : 0.3–2 mm

If each of the sizes of the recessed portion 4 is smaller than the above specified range, durability of a molding die for molding the cover 1 tends to be lowered. On the contrary, if the size of the recessed portion 4 is greater than the above-specified range, the cover 1 may possibly be broken relatively easily when it is urged by a sharp matter such as a finger nail.

In the cover 1 having thus been constituted, when an inflation pressure of the air bag is exerted, since the recessed portions are localized closely near the central area of the cover 1 to make the central area weakest, tearing is started from the central area of the cover. Once tearing starts from the central area, it develops from the pointed top end of the recessed portion to the pointed top end of the adjacent recessed portion and then rapidly prevails along all of the tear lines as far as the ends thereof. That is, the top ends 4a, 4b of the recessed portion 4 are situated at the deepest position 3a in the groove 3 and tearing in the recessed portion 4 rapidly propagates toward the adjacent recessed portion 4 also to the groove 3 other than the recessed portion 4. Also, the portion 3a is the most thinnest in the groove 3 and tearing prevails rapidly along the deepest position 3a in the groove 3.

As has been described above, the central area of the cover 1 can be weakened most by making the distance between the recessed portions 4 in the central area of the cover 1, but the central area of the cover 1 may also be made most weakest by increasing the depth of the recessed portion 4 in the central area.

It is only necessary for the recessed portion in the present invention that the top end of the hole in the direction of the row has a corner pointed toward an adjacent recessed portion and that the position deviates from the center line for the recessed portion and it may have a shape other than those shown in FIG. 1-FIG. 4 and FIG. 14.

Figure 11:
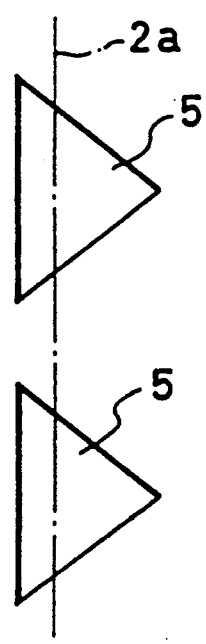
FIG. 11 is a plan view illustrating another embodiment of a recessed hole, as viewed from the rear side, according to the present invention.
Figure 12:
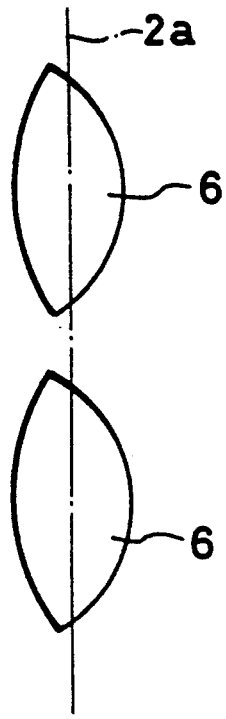
FIG. 12 is a plan view illustrating a further embodiment of a recessed hole, as viewed from the rear side according to the present invention.
Figure 13:
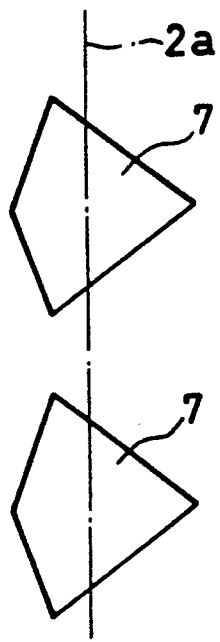
FIG. 13 is a plan view illustrating a further embodiment of a recessed hole, as viewed from the rear side, according to the present invention.

For instance, various shapes can be adopted such as a recessed portion 5 having a planer triangular shape as viewed vertically to the cover inner surface shown in FIG. 11, a recessed portion 6 having a substantially arcuate planer shape as viewed vertically to the cover inner surface as shown in FIG. 12 and a recessed portion 7 having a substantially planer tetragonal shape as viewed vertically to the cover inner surface as shown in FIG. 13. In FIGS. 11-13, reference numeral 2a denotes a center line for the tear line.

In FIG. 1-FIG. 4 and FIG. 15, the angle at the top end of the recessed portion (8 in FIG. 1) is preferably from 5° to 80°.

There is no particular restriction also on the cross sectional shape for the groove and recessed portion. Further, the tear line not necessarily has a combination of the groove and the recessed portions but it may comprise only the recessed portion.

As has been described above specifically, in the air bag cover according to the present invention, tearing propagates reliably along the direction of the row of the recessed portions. Accordingly, when the distance between the recessed portions of the row is adjusted to form a weakest zone in which recessed portions are localized, it is possible to start to tear the cover from the weakest zone and surely propagate tearing along the tear line. Therefore, a performance of constraining an occupant upon collision of a vehicle can be improved remarkably. Further, if unexpected force is exerted on the cover, the cover does not scatter.

Further, upon injection molding of the air bag cover, since strength around the tear line is not reduced by molding failure or weld line, the molding stability and the tearing stability can be improved further.

What is claimed is:

1. An air bag cover comprising:
   a groove disposed in an inner surface of a cover and having a triangular cross section and a straight line at a bottom thereof,
   recessed portions for tearing the cover which are disposed in the groove to be spaced apart from each other in a row, each of the recessed portion being trapezoid and the recessed portions being arranged such that each of long side of the trapezoid is situated on the straight line at the bottom of the groove,
   each of top ends of the recessed portions in the direction of the row being pointed toward each of adjacent recessed portions, and
   said pointed top end being situated at a position deviated from a center of the recessed portion along a lateral direction of the recessed portion.

2. A cover as defined in claim 1, wherein the cover is an injection molded product from a synthetic resin.

3. An air bag cover comprising:
   a cover portion having an inner surface,
   a groove formed in the inner surface of the cover portion and having a triangular cross section and an apex line, and
   recessed portions for tearing the cover upon inflation of an air bag, said recessed portions being situated in the groove and arranged in a row to be spaced apart from each other, each recessed portion having a center line extending in a direction of the row, and top ends oriented in the direction of the row and pointed toward adjacent recessed portions, said top ends being located in the apex line and laterally deviated from the center line of the recessed portion so that when the cover portion is injection molded, each part between the adjacent recessed portions is completely filled with a material without molding failure and weld line, portions between the top ends of the adjacent recessed portions tearing off when the air bag is opened.

4. A cover as defined in claim 3, wherein the recessed portion has at least one of trapezoidal, arcuate and triangular planar shape as viewed vertically relative to the cover inner surface.

* * * * *